United States Patent [19]

Larkin

[11] Patent Number: 4,486,008
[45] Date of Patent: Dec. 4, 1984

[54] PLAY ENCLOSURE FOR CHILDREN

[75] Inventor: Bryan J. Larkin, Bexley, Australia

[73] Assignees: Donald Andrew Logan; Arthur Edward Pty. Ltd.; Sunlea Developments Pty. Ltd., all of New South Wales, Australia

[21] Appl. No.: 504,052

[22] PCT Filed: Oct. 5, 1982

[86] PCT No.: PCT/AU82/00163

§ 371 Date: May 27, 1983

§ 102(e) Date: May 27, 1983

[87] PCT Pub. No.: WO83/01185

PCT Pub. Date: Apr. 14, 1983

[30] Foreign Application Priority Data

Oct. 2, 1981 [AU] Australia .................... PF1052
Oct. 14, 1982 [NZ] New Zealand ............ 202167
Oct. 15, 1982 [ZA] South Africa ............ 82/7558
Oct. 20, 1982 [CA] Canada ..................... 413784

[51] Int. Cl.³ .............................................. E04H 17/16
[52] U.S. Cl. ........................................ 256/26; 5/99 C
[58] Field of Search .............. 256/25, 26; 5/99 C, 5/99 B; 182/163

[56] References Cited

U.S. PATENT DOCUMENTS

| 112,276 | 2/1871 | Peregoy | 182/163 |
| 494,073 | 3/1893 | Necker | 182/163 |
| 2,810,554 | 10/1957 | Blazey | 256/25 |
| 3,216,526 | 11/1965 | Cole | 182/163 |

FOREIGN PATENT DOCUMENTS 75319 1/1953 Denmark ..................... 256/25

*Primary Examiner*—Andrew V. Kundrat
*Attorney, Agent, or Firm*—Ladas & Parry

[57] ABSTRACT

A play enclosure for a child, the play enclosure including two rings formed of pivotally connected links and a plurality of rods extending between the two rings.

4 Claims, 4 Drawing Figures

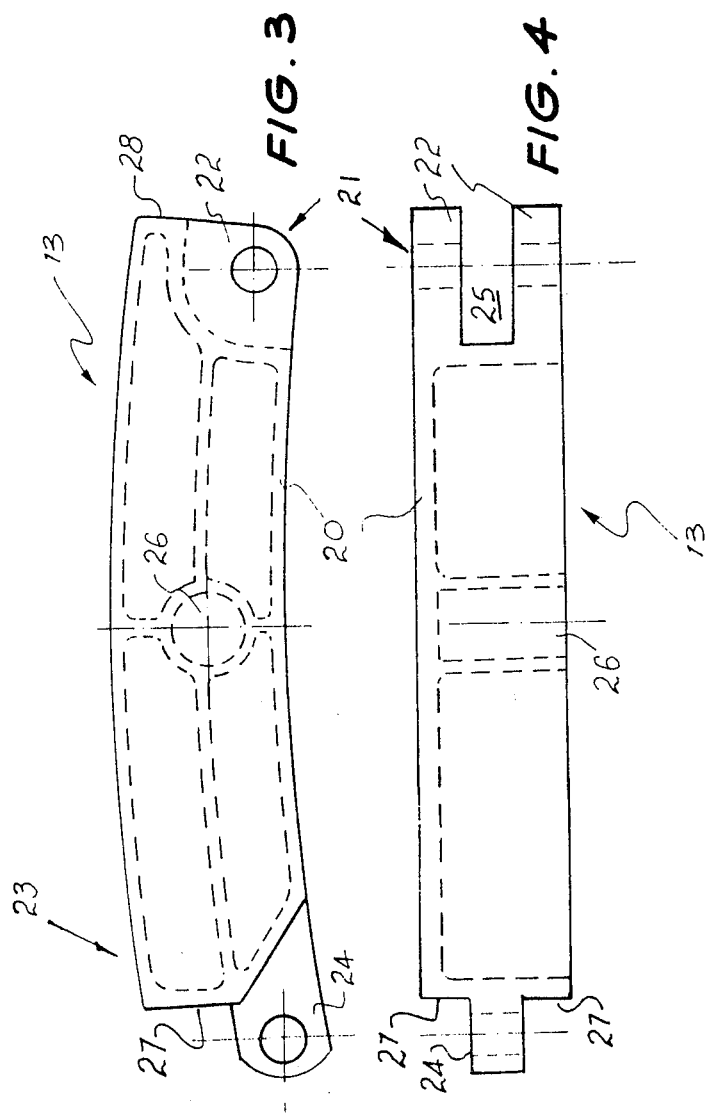

PLAY ENCLOSURE FOR CHILDREN

The present invention relates to elongated members constructed of links and more particularly but not exclusively to play enclosures for children, which play enclosures are constructed of links.

BACKGROUND ART

It is a disadvantage of known play enclosures and portable cots for children that they are not adaptable for several uses in that a play enclosure is a separate item to a cot and a child's swimming pool.

Accordingly there is considerable expense providing these items for children.

A still further disadvantage is that the abovementioned items are generally cumbersome and space consuming and therefore are not conveniently portable.

It is an object of the present invention to overcome or substantially ameliorate the above disadvantages.

DISCLOSURE OF THE INVENTION

There is disclosed herein a flexible link structure comprising a first and a second elongated member each formed of a plurality of pivotally connected links, the links being pivotally attached so as to be pivotable relative to each other about axes normal to the general direction of extension of the members, a plurality of rods extending between the first and second members so as to retain the members in a spaced generally parallel co-extensive relationship, said rods being arranged in a spaced generally parallel co-extensive relationship so as to extend generally normal to the members and wherein the links are provided with abutment faces which engage to prevent relative movement between adjacent links about said axes beyond a predetermined position.

BRIEF DESCRIPTION OF THE DRAWINGS

A preferred form of the present invention will now be described by way of example with reference to the accompanying drawings, wherein:

FIG. 3 is a side elevation of a link employed in the play enclosure of FIG. 1; and FIG. 4 is a side elevation of the link of FIG. 3.

BEST MODE OF CARRYING OUT THE INVENTION

Figure 1:
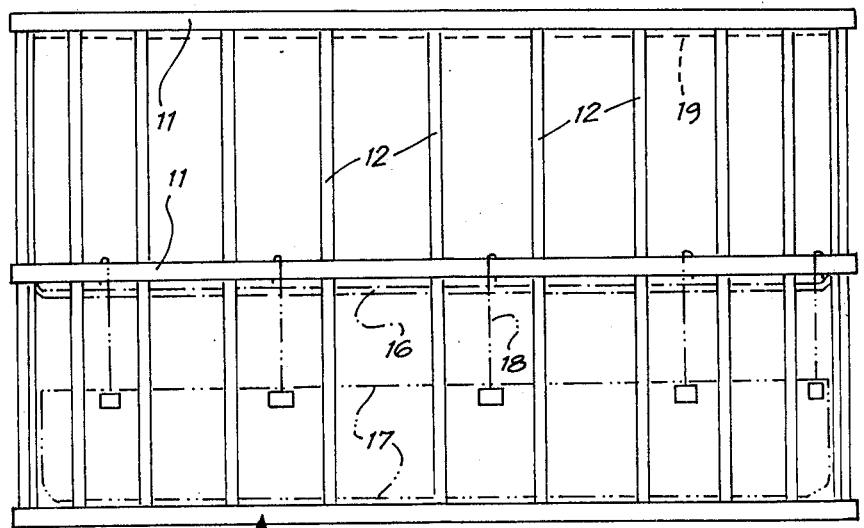
FIG. 1 schematically depicts a child's play enclosure.
Figure 2:
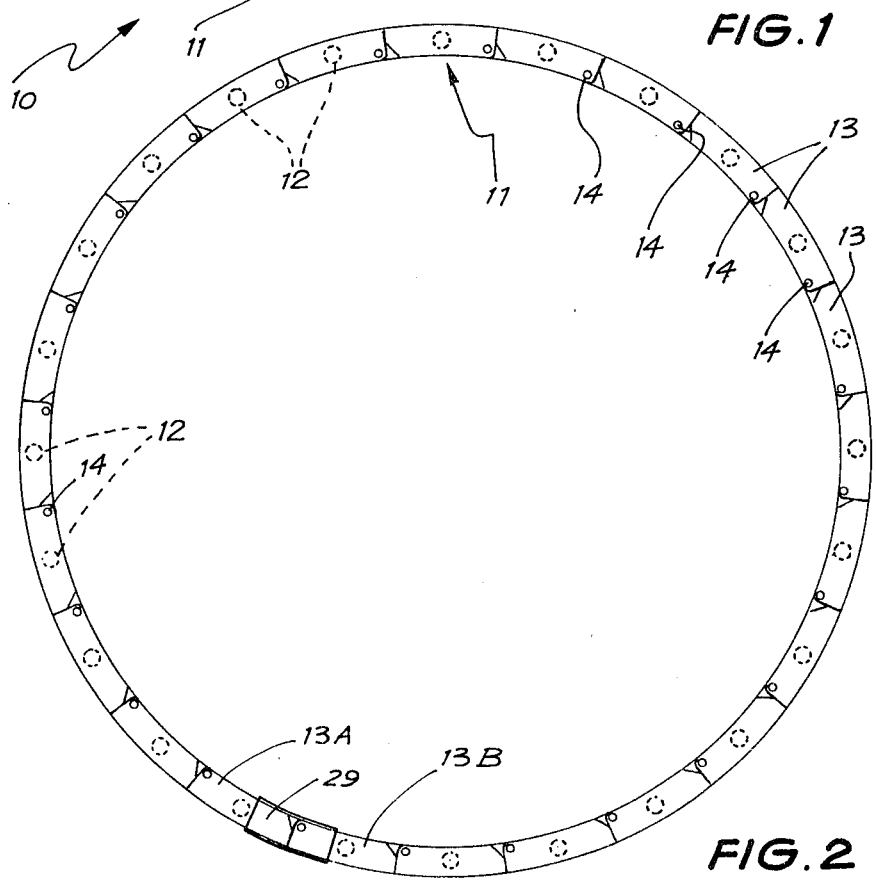
FIG. 2 is a plan view of the enclosure of FIG. 1.

The child's enclosure 10 schematically depicted is adapted for use as either a playpen, a bed or child's swimming pool. The enclosure 10 is formed by three rings 11 which are generally coaxial but vertically spaced and horizontally oriented. The rings 11 are joined by a plurality of rods 12 which hold the rings 11 in a spaced parallel relationship. Each of the rings 11 is formed of a plurality of links 13 which are pivotally coupled by pins 14. Additionally, the links 13 are provided with abutting faces which define when abutting a predetermined configuration so as to form the rings 11. The rods 12 extend through the links 13.

To enable the enclosure 10 to be used as a child's bed, a bed support 16 is coupled to the central ring 11 so as to support a mattress for the child. Additionally, the enclosure may be adapted as a child's swimming pool by providing a water right membrane 17 which covers the bottom of the enclosure 10 and extends partly upward of the sides of the enclosure 10. The sides of the membrane 17 would be supported by resilient strips 18 which extend upwardly to hook over the central ring 11.

Additionally, a shade cloth may be provided in the form of a sheet 19 which is attached to the upper portion of the enclosure 10 to thereby shade a child located in the enclosure 10.

It should be appreciated that the linked construction forming the rings 11 may also be used so as to provide any number of elongated members such as ladders and members for form work.

The above enclosure 10 is easily folded by uncoupling the links 13A and 13B which are coupled by means of a clip 29. Upon the clip 29 being removed, the links 13 may be pivoted about the pins 14 thereby enabling the enclosure 10 to be rolled up. As can be appreciated from the above description, independent of the linked construction use, the linked construction may easily be folded for ease of transportation. As, for example, a ladder constructed as above may be easily rolled up for transportation.

Referring now to FIGS. 3 and 4 wherein the link 13 is more fully depicted. Each link 13 includes a body 20 which is preferably of molded plastics material so as to have a first end 21 which defines a yoke with two lugs 22 which are adapted to pivotally engage the next adjacent link 13 by means of a pin. The other end 23 of the body 20 has a projection 24 which is adapted to be received within the aperture 25 defined between the lugs 22 of the next adjacent link. The pin also passes through the projection 24 to thereby secure the adjacent links together.

The body 20 can be provided with a hole 26 which, in the present instance, is a blind hole. It should be appreciated that a blind hole would be employed in links where the link 13 is located along the top or bottom of the play enclosure. If the link is located intermediate the top or bottom of the play enclosure, hole 26 would pass through the body 20.

Additionally, body 20 has a pair of faces 27 which abut the end face 28 of the next adjacent link to thereby define the predetermined position beyond which the links will not pivot further.

I claim:

1. A foldable child play enclosure comprising, a coextensive vertically spaced top and bottom generally horizontally oriented ring, the rings defining a space within which a child is to be retained, each ring consisting of a plurality of links pivotally attached at their ends so as to have their longitudinal direction of extension along the ring form thereby, each link being integrally moulded with one end having a yoke consisting of two vertically spaced lugs and the other end having a projection to be located between the lugs of the adjacent link, a positioning surface on each link positionable to abut an adjacent link so as to define the relative positions of adjacent links to thereby define the configuration of the rings, pivot means pivotally coupling each yoke with this associated projection of the adjacent link to thereby enable relative pivoting movement between adjacent links about a vertical axis, and release means releasably coupling a pair of links in each ring, with the pairs of links being vertically aligned, said release means being operable to release the links of each pair so that the enclosure may be rolled up by pivoting adjacent links relative to each other in a predetermined direction and wherein the abutting positioning surfaces prevent pivoting of the link in a direction opposite to said predetermined directions beyond a predetermined position.

2. The foldable play enclosure of claim 1 wherein said links pivot inwardly of the rings to enable folding, and said positioning surfaces prevent pivoting of the links outwardly to open up the rings.

3. The foldable play enclosure of claim 1 or 2 further including a plurality of vertical rods extending between the rings so as to support the rings in their vertical space parallel relationship.

4. The foldable child play enclosure of claim 3 wherein said rods are attached to the links generally centrally thereof.

* * * * *